Figure 1:
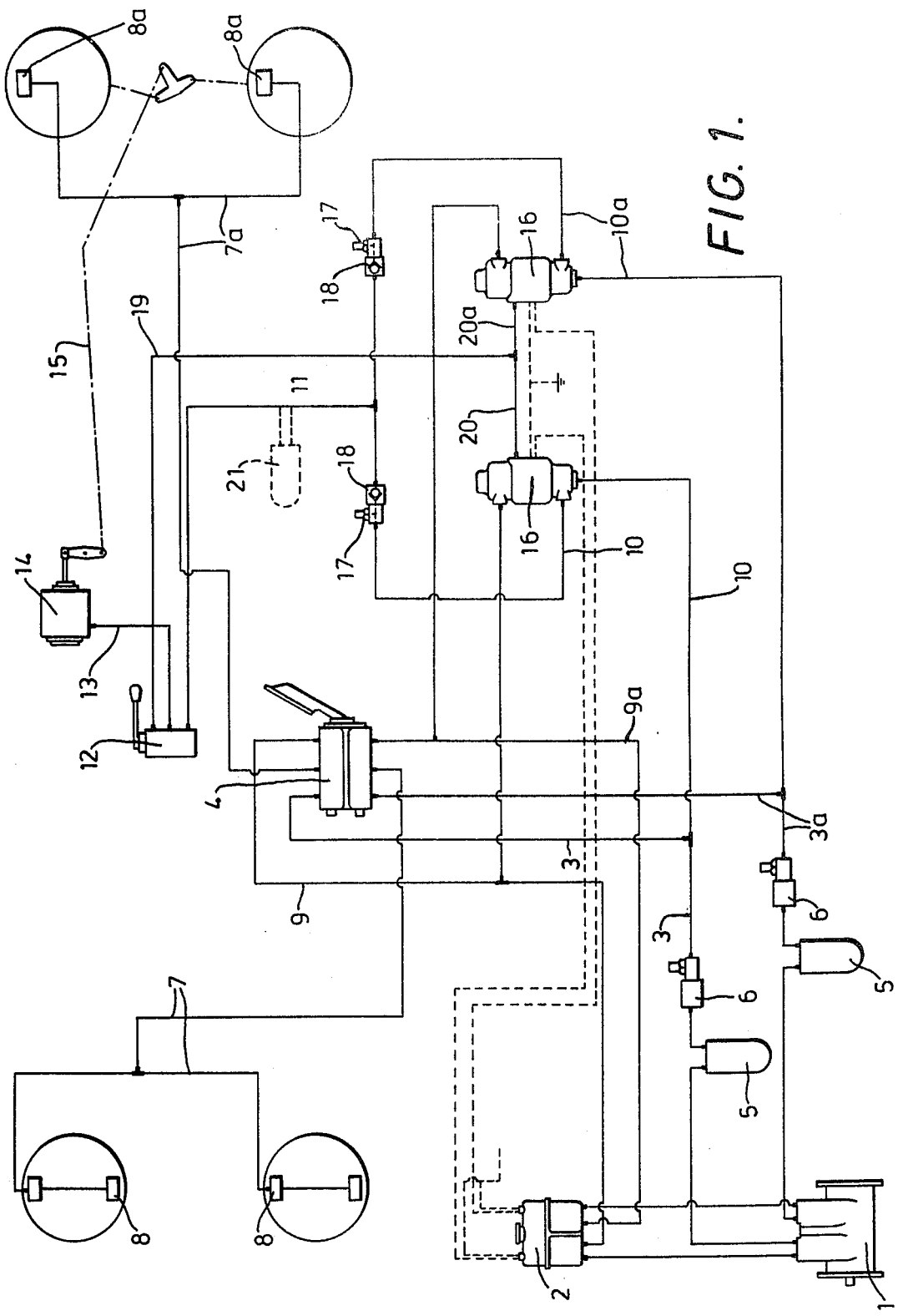

United States Patent [19]

Page et al.

[11] 3,945,691

[45] Mar. 23, 1976

[54] FULL-POWER HYDRAULIC BRAKING SYSTEMS

[75] Inventors: Wilbur Mills Page; Phillip Applewhite, both of Lincoln, England

[73] Assignee: Clayton Dewandre Company Limited, Lincoln, England

[22] Filed: Dec. 5, 1974

[21] Appl. No.: 529,958

[52] U.S. Cl. .............................. 303/84 R; 303/63
[51] Int. Cl.² ........................................ B60T 17/18
[58] Field of Search ............ 188/106 P, 170; 303/2, 303/14, 15, 63, 71, 84 A, 84 R, 85; 137/516.25, 516.29, 533, 537, 540

[56] References Cited
UNITED STATES PATENTS

| | | | |
|---|---|---|---|
| 2,871,066 | 1/1959 | Pannier et al. | 303/63 |
| 2,945,727 | 7/1960 | LaDona | 303/63 |
| 3,020,094 | 2/1962 | Murty et al. | 188/170 X |
| 3,272,566 | 9/1966 | Clack | 188/170 X |
| 3,273,582 | 9/1966 | Valentine | 303/85 X |
| R15,343 | 4/1922 | Hellmann et al. | 303/63 |

Primary Examiner—Duane A. Reger
Attorney, Agent, or Firm—Norris & Bateman

[57] ABSTRACT

A full-power hydraulic braking system comprises two independently-powered service circuits serving separate sets of brakes, a common pedal-actuated dual brake valve controlling operation of said circuits, a spring brake actuator fed from both service circuits through separate lines and, in each of said lines, a pressure responsive protection valve operable in the event of a failure in either service circuit to cut off the spring brake actuator from that service and ensure continued operation of said actuator from the other service circuit.

9 Claims, 2 Drawing Figures

FULL-POWER HYDRAULIC BRAKING SYSTEMS

This invention relates to full-power hydraulic braking systems of the kind comprising two independently-powered service circuits serving separate sets of brakes under the control of a common pedal-actuated dual brake valve.

To systems of this kind it has been proposed to add a spring brake actuator for parking and as a supplementary braking system, such actuator being usually pressurised from the accumulator of one of the powered hydraulic service circuits and being under the control of a hand control valve. Such systems however suffer from the defect that a failure in the spring brake actuator circuit, or in the service circuit to which it is connected, can put both said circuits out of action leaving only one service braking system available.

The object of the present invention is to provide a combined system which overcomes this defect in a simple and reliable manner without undue complication of the system.

According to the present invention in a dual circuit hydraulic braking system of the kind mentioned, a spring brake actuator is provided and is fed from both service circuits through separate lines each incorporating a pressure responsive protection valve operable in the event of a failure in the related service circuit to cut off that circuit from the spring brake circuit whereby the latter continues to be fed from the other service circuit. The protection valves may also be operable to shut off fluid flow to the spring brake circuit in the event of lowering of fluid level in the system reservoir, whilst provision may also be made for relieving possible build-up of pressure in the reservoir return line from the spring brake control valve, and one embodiment of the invention incorporating these features will now be described in more detail, with reference to the accompanying drawings wherein FIG. 1 shows diagrammatically the improved braking system and FIG. 2 is an axial section through one of the pressure responsive protection valves.

Referring first to FIG. 1 the system shown comprises a dual pump 1, the sections of which are fed from a divided reservoir 2 and delivers pressure fluid separately and via supply lines 3, 3a to the two inlet ports of a pedal-actuated dual brake valve 4, the two supply lines 3, 3a each incorporating an accumulator 5 and a combined filter and low pressure switch 6. The outlet ports of the brake valve are connected respectively and by lines 7, 7a to the front and rear wheel brake cylinders 8, 8a while the return ports of said valve are connected by lines 9, 9a to the respective reservoir section whereby there are formed two independent service circuits. For the purpose of the present invention the supply lines 3, 3a to the brake valve are branched immediately upstream of said valve, the branches 10, 10a being connected by a common line 11 to the inlet port of a standard hand control valve 12 operable to control the admission of pressurised fluid via a line 13 to a single piston type spring brake unit 14 actuating one set, for example, the rear wheel set, of brakes through a mechanical transmission 15. The branch lines 10, 10a each incorporate a protection valve 16 more fully described hereafter a low pressure switch 17 and a non-return valve 18, the return line 19 from the hand control valve 12 being branched and the branch lines 20, 20a connected via the protection valves 16 to the return lines 9, 9a of the two service circuits. An additional accumulator 21 may also be incorporated in the common feed line 11 to the hand control valve.

Figure 2:
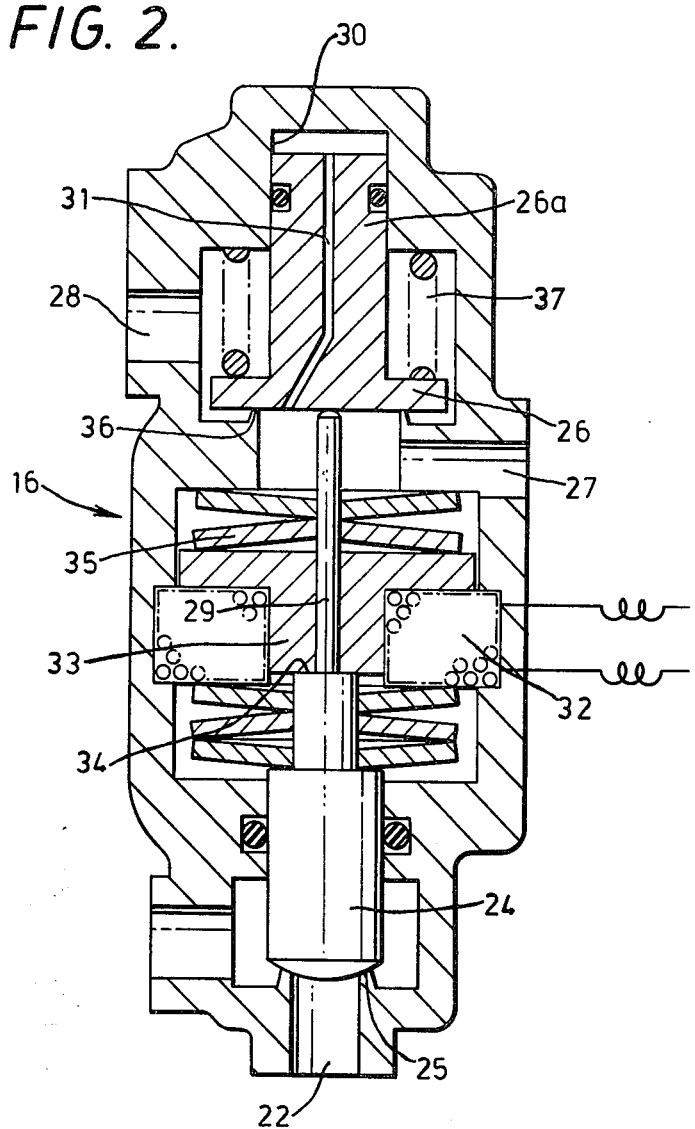

Referring now to FIG. 2, each protection valve comprises a housing embodying at the lower end an inlet port 22 for connection to the branched supply line 10, 10a, a delivery port 23 for connection to the hand control valve 12, and a spring-loaded plunger-type inlet valve element 24 with an annular seating 25 around the inlet port, the arrangement being such that the valve element will be pushed off its seating to permit flow of pressure fluid to the delivery port only when the fluid is supplied to the inlet port above a predetermined pressure. At the upper end of the valve housing a spring-loaded disc valve element 26 controls fluid flow between a port 27 connected to the return line 20 from the hand control valve and a port 28 connected to the return line 9 (9a) in the related service circuit, a stem 29 on the plunger valve element 24 abutting the disc valve element 26 such that the latter is operated, that is, lifted from its seating, in unison with the plunger valve.

A stem 26a on the disc valve element 26 slides in a blind bore 30 in the housing, the inner end of said bore communicating via a passage 31 in the valve element with the outer face thereof which is responsive to return flow line pressure. The housing also accommodates a solenoid 32 the circuit of which is controlled by low level switches (not shown) in the reservoir 2, the armature of the solenoid sliding upon the stem 29 on the plunger valve and being normally held by the solenoid coil out of engagement with a shoulder 34 on the plunger valve 24 and in opposition to a supplementary loading spring 35.

During normal operation, the dual circuit braking system operates in the usual manner while the spring brake system is fed from both service circuits and the return flow from the hand control valve returns to either circuit. However, upon a failure in either service circuit, the inlet valve element 24 of its related protection valve will close with a corresponding closure of the related disc valve 26 in the return flow line, but the spring brake system will continue to be fed from the other service circuit and fluid will return to that circuit.

Should a leakage occur in the spring brake system the plunger valves 24 may lift minutely under the pressure pertaining in the service circuits sufficient to allow slight flow. However, the lowering of fluid level in the reservoir 2 will eventually cause the solenoid circuits to be broken whereby additional spring loading will be created on the plunger valves to hold them with greater force on their seatings.

Where an external leakage occurs the low level switches in the reservoir will also cause both protection valves 16 to shut off all flow to the spring brake circuit, both pressure feed and return fluid, but the service circuits will remain operative. Under this condition, it is necessary to provide a relief valve to prevent an excessive high pressure being established in the hand control valve return line which could be caused by release of the spring brake or by thermal expansion. A relief valve is, in fact, provided by each of the disc valves 26 which contacts its seating 36 at a diameter larger than that of its stem 26a whereby when pressure is created in the return line 19 from the hand control valve, a load is created on the disc valve which, at a predetermined pressure, will overcome the loading of said valve by its spring 37. Thus the valve is lifted to relieve the pressure on the said return line.

The low pressure warning switch 17 followed by the non-return valve 18 in each of the feed lines 10, 10a between the protection valve and the junction with the common feed line into the hand control valve is desirable to ensure indication of a failure of either protection valve to function. The switches 17 operate individual buzzers, and to satisfy the requirement of imminent spring brake dragging, these switches could additionally be mounted in series with a further buzzer. In this case each must indicate a low pressure before the buzzer operates. This arrangement would necessitate either double switches or double pairs of contacts.

We claim:

1. In a hydraulic braking system of the kind wherein two independently powered service circuits are connected through valve means to serve separate sets of vehicle brakes, wherein the system includes a spring brake actuator having operative connection to at least one of said sets of vehicle brakes and having fluid pressure responsive control means connected to both service circuits through separate lines each incorporating a pressure responsive protection valve, each valve being normally open when the pressure in its related service circuit exceeds a predetermined amount and being operable in the event of a failure of pressure in the associated service circuit to cut off that circuit from the spring brake actuator while the actuator continues to maintain operative connection with the other service circuit which continues to supply fluid pressure to said spring brake unit.

2. A hydraulic braking system as claimed in claim 1, wherein each said protection valve includes a pressure-responsive spring-loaded inlet valve element operable to cut off the connection from the associated service circuit when pressure in that circuit falls below a predetermined value.

3. A hydraulic braking system as claimed in claim 2 and including a hand-operated valve for controlling flow of pressure fluid to and from the spring brake actuator, wherein a further valve element in each protection valve is operable in unison with said inlet valve to cut off a connection between a return line from said hand control valve and a return line of the associated service circuit.

4. A hydraulic braking system as claimed in claim 3, wherein each said further valve element is spring-loaded onto a seating and acts as a relief valve to prevent an excessive pressure being established in said return line from said hand control valve.

5. A hydraulic braking system as claimed in claim 1, wherein each service circuit includes a separate reservoir section and said protection valve includes means operable to shut off fluid flow to the spring brake actuator in the event of a predetermined fall of fluid level in the associated reservoir section.

6. A hydraulic braking system as claimed in claim 2, wherein each protection valve comprises a solenoid the circuit of which is controlled by a low level switch in the associated reservoir section and which when energized moves the inlet valve onto and holds it on its seating.

7. A hydraulic braking system as claimed in claim 3, wherein the feed lines from the respective service circuits to said hand control valve each include a low pressure warning switch and a non-return valve.

8. A hydraulic braking system as claimed in claim 7, wherein said low pressure switches actuate individual signal means.

9. A hydraulic braking system of the kind in which two independently powered service circuits are connected through valve means to serve separate sets of wheel brakes, wherein the system includes a spring brake actuator fed to receive fluid pressure from both service circuits through separate control circuit lines each incorporating a pressure responsive protector valve operable in the event of a failure of pressure in the associated spring brake actuator control circuit line to cut off that control circuit line and so maintain the integrity of the two service circuits.

\* \* \* \* \*